Nov. 22, 1960 P. P. NEWCOMB 2,960,827
RESILIENT BEARING SUPPORT
Filed June 26, 1959
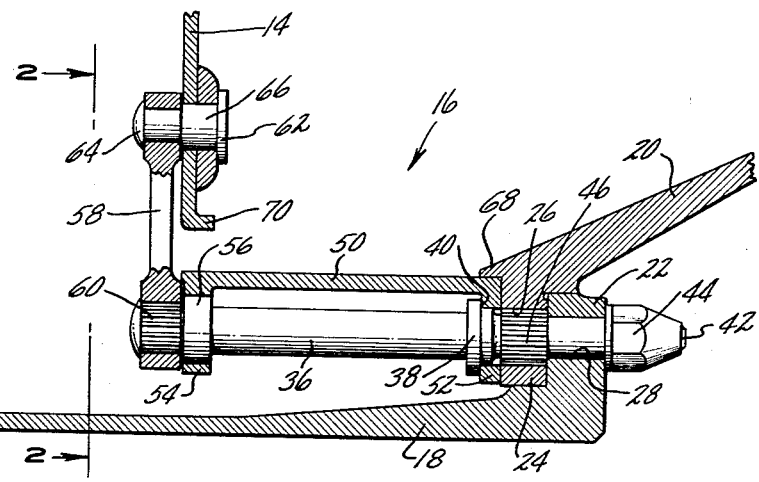
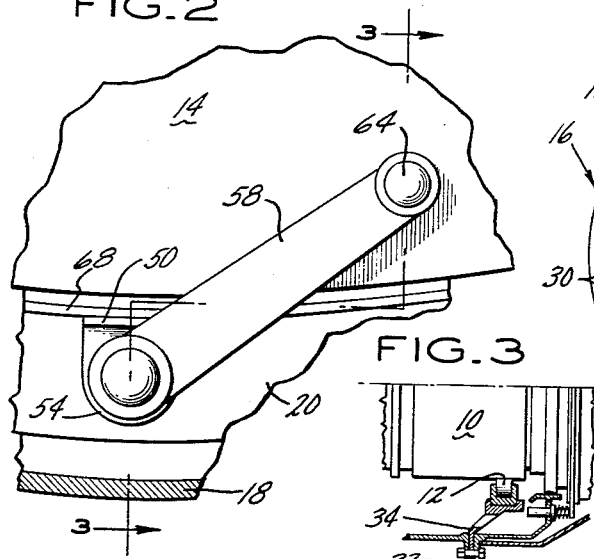
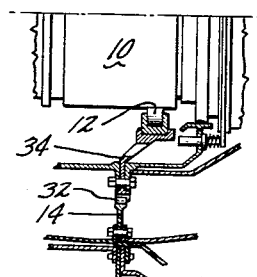
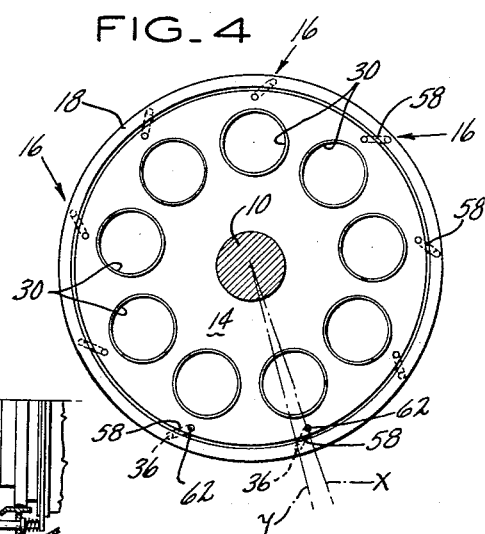
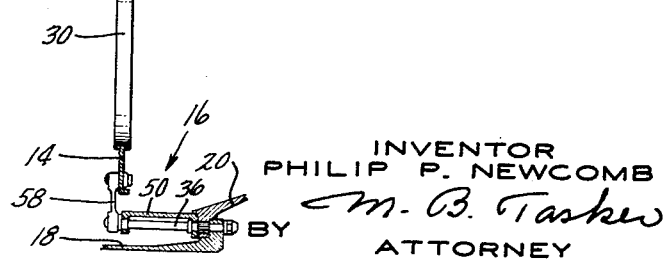
INVENTOR
PHILIP P. NEWCOMB
BY M. B. Tasker
ATTORNEY

United States Patent Office 2,960,827
Patented Nov. 22, 1960

2,960,827

RESILIENT BEARING SUPPORT

Philip P. Newcomb, Manchester, Conn., assignor to United Aircraft Corporation, East Hartford, Conn., a corporation of Delaware Filed June 26, 1959, Ser. No. 823,231

8 Claims. (Cl. 60—39.32)

This invention relates to gas turbine engines commonly used in aircraft and more specifically to improved means for supporting an intermediate engine shaft bearing. One means of supporting such a bearing is shown in Patent No. 2,846,847, issued to W. G. Simmons on August 12, 1958. The present invention is particularly applicable to engines of large size.

It is an object of this invention to provide an improved support for a bearing intermediate the ends of the engine shaft which supports the bearing from the outer engine casing while permitting a desirable degree of radial flexibility in the support under heavy bearing loads during aircraft maneuvers.

It is another object of this invention to provide a diaphragm-type support for an engine main bearing which is supported on torsional springs adjacent its periphery.

These and other objects and advantages of the invention will become evident from the following detailed description of one embodiment of the invention shown in the accompanying drawing. In this drawing:

Fig. 1 is a side elevation, partly in section, showing one of the diaphragm supports;

Fig. 2 is a section taken on line 2—2 of Fig. 1;

Fig. 3 is a section taken on line 3—3 of Fig. 2; and

Fig. 4 is a transverse section taken through the engine showing the location of the resilient supporting means about the periphery of the bearing supporting diaphragm.

Referring to Figs. 3 and 4 of the drawing, the engine includes an axial shaft 10 which has an intermediate roller bearing 12 supported by a diaphragm 14. The diaphragm which is circular is supported at its periphery by resilient means generally indicated at 16 carried by the annular engine housing. This housing as shown in Figs. 1 and 3, consists of two connected sections 18 and 20 which have abutting annular flanges 22 and 24 provided with registering holes 26 and 28 through which clamping means extend, hereinafter described, for clamping the casing sections together.

The diaphragm 14 is provided with a series of annularly arranged holes 30 through which burner cans project. It will be evident, therefore, that the diaphragm 14 is subjected to a very wide range of temperatures. In order to allow for the radial expansion of the diaphragm, the inner periphery of the diaphragm is provided with splines 32 which mesh with corresponding external splines on a bearing supporting ring 34.

In addition, the diaphragm 14 is provided with a relatively rigid support at its outer periphery which, however, can yield as the diaphragm moves radially under heavy bearing loads. To this end a plurality of torsion bars 36 are provided about the periphery of the diaphragm and these bars are used as the fastening means for clamping the casing flanges 22 and 24 together.

As shown most clearly in Fig. 1, each of the torsion bars 36 is fixed rigidly at one end to the engine outer housing by a shank portion which extends through a pair of aligned passages 26 and 28 in the flanges 22 and 24 of the housing sections 18 and 20. The shank portion extends from an annular flange 38 which forms an abutment or shoulder 40 to a threaded end portion 42 which receives a clamping nut which bears against flange 22. The part of the shank portion which passes through flange 24 is provided with splines 46 which engage mating splines in the passage 26. Each torsion bar is also provided with an elongated U-shaped member 50 having short parallel legs 52 and 54. These legs are provided with aligned circular apertures to receive annular portions of torsion bar 36. It will be noted that the leg 52 is clamped between the shoulder 40 and flange 24. It will also be noted that the splined portion 46 is larger than the annular threaded end portion of the bar to provide a shoulder against which the flange 22 is clamped by the nut 44. Thus, the nut 44 not only secures the torsion bar rigidly to the casing but also secures the casing sections 18 and 20 together.

At the free end of the torsion bar the aperture in leg 54 forms a bearing for an enlarged annular flange 56 on the torsion bar within which the torsion bar is free to turn. Each torsion bar is rigidly and nonrotatably connected at its free end to a rigid arm 58 by means of a splined connection 60. The free end of each arm 58 is pivotally connected to diaphragm 14 adjacent the periphery of the latter by a shoulder pivot 62 pivotally mounted in diaphragm 14 to the end of which the free end of arm 58 is secured by the riveted head 64. It will be understood the shoulder pin 62 is free to rotate relative to the diaphragm 14 on its enlarged annular shank portion 66.

As will be evident from consideration of Fig. 4, the shoulder pin 62 lies on a radius X of shaft 10, whereas the torsion bar 36 lies on a radius Y of shaft 10 so that radial forces transmitted from the engine shaft to the diaphragm 14 exert a force on arms 58 tending to rotate the torsion bars 36 about their own axes. The torsion bars are free to turn at their free ends as the pivot pins 62 move radially, but the shank portions of the torsion bars are held against rotation by the splines 46 and their mating splines in flange 24. Also, the U-shaped member 50 is prevented from rotating by a horizontal rib 68 at the base of flange 24 which overlies the adjacent end of member 50.

Preferably, the diaphragm 14 is provided with an annular stiffening flange 70 at its outer periphery, as shown in Fig. 1.

In operation, radial movement of pins 62 due to loads applied to diaphragm 14 by the engine shaft are transmitted as torsional forces to bars 36 by lever arms 58. These forces are absorbed by bars 36 which are made of tempered spring steel. As a result, the heavy bearing loads which result from sudden maneuvers are absorbed by the torsion bars and are safely transmitted by these bars to the enclosing casing.

It will be evident that as a result of this invention means has been provided to absorb large radial forces exerted by the diaphragm 14 while at the same time providing adequate support for the bearing 12. Also, it will be evident that means has been provided to permit relatively large torsional forces to be applied to the bars 36 while resisting the bending moments on these bars by members 50.

While only one embodiment of the invention has been shown herein, it will be understood that various changes in the construction and arrangement of the parts may be made within the scope of the invention.

I claim:

1. In a gas turbine engine, an enclosing casing, an axial shaft extended into said casing, a bearing on said shaft, a bearing supporting diaphragm transverse to said shaft, and means for resiliently supporting said diaphragm at its periphery on said casing comprising a plurality of torsion bars located at spaced points about the periphery of said diaphragm in parallel relation to said shaft, each of said bars having one end thereof fixed in said casing, an arm for each of said bars, each arm having one end thereof fixed to the free end of a bar and said arm having its other end pivotally connected to said diaphragm on a pivot which is parallel with said bar, said pivots for said arms lying on radii of said shaft spaced from radii of the latter which intercept said bars.

2. In a gas turbine engine, an enclosing casing, an axial shaft extended into said casing, a bearing on said shaft, a bearing supporting diaphragm transverse to said shaft, and means for resiliently supporting said diaphragm adjacent its periphery on said casing comprising a plurality of torsion bars located at spaced points about the periphery of said diaphragm, each of said bars having one end fixed in said casing, journal means carried by said casing for supporting the free ends of said bars, and arms rigidly connected at one of their ends to the free ends of said bars, said arms being pivotally connected at the other of their ends with said diaphragm adjacent its outer periphery.

3. In a gas turbine engine, an enclosing housing, an axial drive shaft, a bearing on said shaft, means for supporting said bearing from said housing including a diaphragm transverse to said shaft, means carried by said housing for resiliently supporting said diaphragm at its periphery against excessive radial movement including a plurality of torsion bars located at spaced points about the periphery of said diaphragm, each bar having one of its ends fixed in said casing with its axis extended parallel with said shaft, and an arm extended from the free end of said bar having one of its ends fixed to said bar and having its other end pivotally connected to said diaphragm by a pivot pin adjacent the periphery of the latter, said pivot pins being parallel with said bars and located on radii of said shaft spaced from radii which intercept said bars.

4. In a gas turbine engine, an annular enclosing casing including two casing sections having overlapping transverse flanges provided with aligned bolt apertures arranged about the peripheries of said flanges, an axial shaft extended into said casing, a bearing in said casing intermediate the ends of said shaft, a transverse diaphragm supporting said bearing, and means for supporting said diaphragm at its outer periphery on said casing including a plurality of torsion bars, each of said bars having at one end an annular threaded shank portion terminating in a shoulder, said shank portion having a splined portion meshing with mating splines in the bolt aperture of one of said flanges, a nut on said shank portion for securing each bar to said casing at said one end and for clamping said flanges together with said shoulder against said casing, an arm fixed at one end to the other end of each of said bars, said arms lying in planes parallel to said diaphragm, and a pivot pin pivotally connecting the other end of each of said arms with said diaphragm at spaced points about the periphery of the latter.

5. In a gas turbine engine, an annular enclosing casing including two casing sections having overlapping transverse flanges provided with aligned bolt apertures arranged about the peripheries of said flanges, an axial shaft extended into said casing, a bearing in said casing intermediate the ends of said shaft, a transverse diaphragm supporting said bearing, and means for supporting said diaphragm at its outer periphery on said casing including a plurality of torsion bars, each of said bars having at one end an annular threaded shank portion terminating in a shoulder, said shank portion having a splined portion meshing with mating splines in the bolt aperture of one of said flanges, a nut on said shank portion for securing each bar to said casing at said one end and for clamping said flanges together with said shoulder against said casing, an arm fixed at one end to the other end of each of said bars, said arms lying in planes parallel to said diaphragm, a pivot pin pivotally connecting the other end of each of said arms with said diaphragm at spaced points about the periphery of the latter, and supporting means carried by said casing for journalling said bars at their said other ends.

6. In a gas turbine engine, an annular enclosing casing including two casing sections having overlapping transverse flanges provided with aligned bolt apertures arranged about the peripheries of said flanges, an axial shaft extended into said casing, a bearing in said casing intermediate the ends of said shaft, a transverse diaphragm supporting said bearing, and means for supporting said diaphragm at its outer periphery on said casing including a plurality of torsion bars, each of said bars having at one end an annular threaded shank portion terminating in a shoulder, said shank portion having a splined portion meshing with mating splines in the bolt aperture of one of said flanges, a nut on said shank portion for securing each bar to said casing at said one end and for clamping said flanges together with said shoulder against said casing, an arm fixed at one end to the other end of each of said bars, said arms lying in planes parallel to said diaphragm, a pivot pin pivotally connecting the other end of each of said arms with said diaphragm at spaced points about the periphery of the latter, supporting means carried by said casing for journalling said bars at their said other ends, said supporting means including an elongated U-shaped member having short arms transverse to said bars, one of said arms having an aperture through which said shank extends and which is clamped between said shoulder and the adjacent flange, and the other arm forming a journal through which said bar extends and is rotatably supported adjacent its free end.

7. A bearing support for a gas turbine engine of the type having an outer cylindrical casing, an axial shaft extended into said casing and a bearing intermediate the ends of said shaft to be supported, comprising a diaphragm transverse to said shaft supporting said bearing at the inner periphery of said diaphragm, and means for supporting the outer periphery of said diaphragm comprising a series of torsion bars located at spaced points about the periphery of said diaphragm, each of said bars having one of its ends fixed in said casing, an arm rigidly fixed to the other end of each bar and extended transversely thereof, and means for pivoting said arm at its extended end to the periphery of said diaphragm, the pivot means for each of said arms being located on a radius of said shaft spaced from the radius of the latter which intercepts the bar to which said arm is fixed.

8. The combination in a gas turbine engine having an outer casing, a shaft extended into said casing, a bearing intermediate the ends of said shaft and a diaphragm transverse to said shaft for supporting said bearing, of means for supporting said diaphragm at its periphery on said casing including a plurality of resilient torsion bars, each fixed at one end in said casing and each having an arm fixed to its other end and extending transversely of the bar axis, said arms having operative connections at their extended ends with said diaphragm at spaced points about the periphery of the latter, the operative connection of each of said arms lying on a radius of said shaft which is spaced from the radius of the latter which intercepts the bar to which said arm is fixed.

References Cited in the file of this patent
UNITED STATES PATENTS

| | | |
|---|---|---|
| 2,846,847 | Simmons | Aug. 12, 1958 |
| 2,880,027 | Everitt et al. | Mar. 31, 1959 |